(12) United States Patent
Tokai

(10) Patent No.: US 8,521,727 B2
(45) Date of Patent: Aug. 27, 2013

(54) SEARCH APPARATUS, SEARCH METHOD, AND COMPUTER READABLE MEDIUM

(75) Inventor: Kiwame Tokai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 125 days.

(21) Appl. No.: 13/089,849

(22) Filed: Apr. 19, 2011

(65) Prior Publication Data

US 2012/0150873 A1    Jun. 14, 2012

(30) Foreign Application Priority Data

Dec. 13, 2010  (JP) .................................. 2010-276750

(51) Int. Cl.
   *G06F 17/30*   (2006.01)
(52) U.S. Cl.
   USPC .......................................... 707/722; 707/769
(58) Field of Classification Search
   USPC .................................................. 707/769, 722
   See application file for complete search history.

(56) References Cited

U.S. PATENT DOCUMENTS

2004/0143560 A1*  7/2004  Zhu ................................. 706/19
2008/0195587 A1*  8/2008  Hussami ........................... 707/3

FOREIGN PATENT DOCUMENTS

JP    10-198701 A    7/1998

OTHER PUBLICATIONS

Hristidis et al., Keyword Proximity Search on XML Graphs, Proceedings of the 19th International Conference on Data Engineering (ICDE'03), 2003.*
Angles et al., Querying RDF Data from a Graph Database Perspective, ESWC 2005, 2005.*
Abiteboul et al., The Lorel Query Language for Semistructured Data, International Journal on Digital Libraries, 1997.*

* cited by examiner

*Primary Examiner* — James Trujillo
*Assistant Examiner* — William Spieler
(74) *Attorney, Agent, or Firm* — Sughrue Mion, PLLC

(57) ABSTRACT

A search apparatus searches graph data representing a graph including nodes and links. The search apparatus includes the following elements. An input receiving unit receives an input of a reference node indicating a search reference position on the graph and an input of a search condition indicating a condition satisfied by a node, a link, or a combination of a node and a link. A searching unit searches the graph data for a node, a link, or a combination of a node and a link that satisfies the search condition. A search result data generating unit generates search result data indicating at least one search result obtained by the searching unit, together with path data showing a path on the graph from the reference node to each of the at least one search result.

12 Claims, 12 Drawing Sheets

FIG. 3

| SUBJECT (NODE) | PREDICATE (LINK) | OBJECT (NODE) |
|---|---|---|
| Workplace-a | uploaded | Document-a |
| Document-a | created | User-a |
| Document-a | commented | Comment-a |
| Workplace-a | participated | User-c |
| Comment-a | created | User-c |
| ⋮ | ⋮ | ⋮ |

| NODE | HOP NUMBER | PATH FROM REFERENCE NODE |
|---|---|---|
| Document-a | 1 | Workplace-a,uploaded |
| User-c | 1 | Workplace-a,participated |
| User-a | 2 | Workplace-a,uploaded,Document-a,created |
| Comment-a | 2 | Workplace-a,uploaded,Document-a,commented |
| ⋮ | ⋮ | ⋮ |

FIG. 9

| SEARCH RESULT (PARTIAL GRAPH) | PATH FROM REFERENCE NODE | HOP NUMBER |
|---|---|---|
| Document-a,commented,Comment-a | Workplace-a,uploaded | 1 |
| Document-c,commented,Comment-c | Workplace-a,participated,User-c,created, | 2 |
| ... | ... | ... |

SEARCH APPARATUS, SEARCH METHOD, AND COMPUTER READABLE MEDIUM

CROSS-REFERENCE TO RELATED APPLICATIONS

This application is based on and claims priority under 35 USC 119 from Japanese Patent Application No. 2010-276750 filed Dec. 13, 2010.

BACKGROUND (i) Technical Field

The present invention relates to search apparatuses, search methods, and computer readable media.

(ii) Related Art

Methods for describing graph structures expressing the relationships among data elements are known. One of such methods is a resource description framework (RDF) that expresses the relationships among resources by the use of a set of a subject, a predicate, and an object (such a set is referred to as a "triple"). In the RDF, by the use of plural triples, a graph is represented by using resources, which are subjects or objects, as nodes, and by using resources, which are predicates, as links (edges). As computer languages for searching for data described in the RDF, the SPARQL Protocol and RDF Query Language (SPARQL), for example, is known.

SUMMARY

According to an aspect of the invention, there is provided a search apparatus that searches graph data for a node, a link, or a combination of the node and the link, the graph data including plural data elements, each data element being the node, and relationship data that expresses relationships among the plural data elements, the relationship data being the link. The search apparatus includes: an input receiving unit that receives an input of a reference node indicating a search reference position on the graph and an input of a search condition indicating a condition that is satisfied by the node, the link, or the combination of the node and the link; a searching unit that searches the graph data for the node, the link, or the combination of the node and the link which satisfies the search condition; and a search result data generating unit that generates search result data, wherein the search result data indicates at least one search result obtained by the searching unit, the search result being indicated together with path data showing a path on the graph from the reference node to each of the at least one search result.

BRIEF DESCRIPTION OF THE DRAWINGS

An exemplary embodiment of the present invention will be described in detail based on the following figures, wherein:

FIG. 3 illustrates an example of data forming the graph shown in FIG. 2;

FIG. 9 illustrates an example of the data content of sorting results;

DETAILED DESCRIPTION

Figure 1:
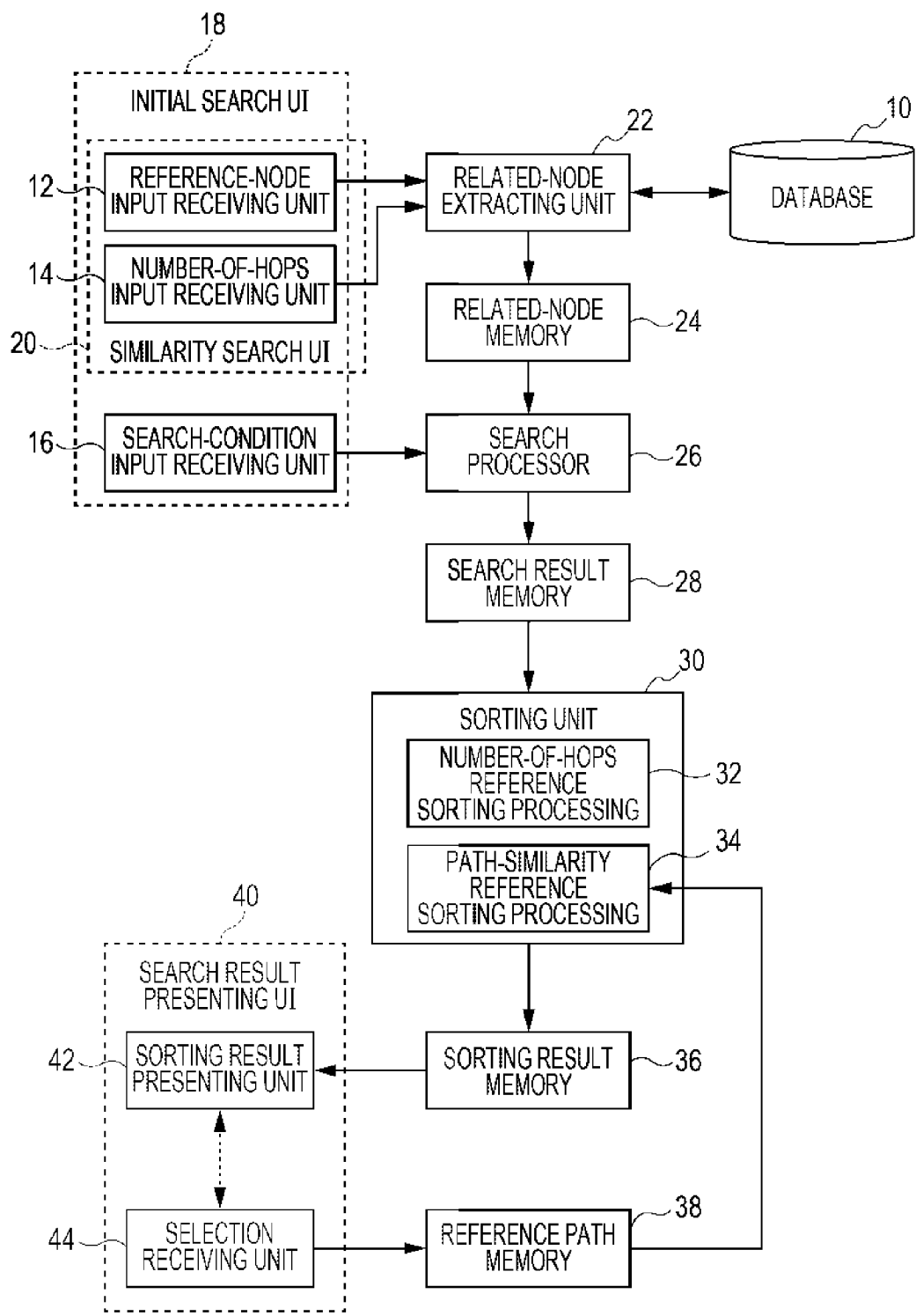
FIG. 1 is a functional block diagram illustrating an example of the configuration of a search apparatus according to an exemplary embodiment of the invention.

FIG. 1 illustrates an example of the functional configuration of a search apparatus according to an exemplary embodiment of the invention.

In the functional configuration of the search apparatus shown in FIG. 1, in a database 10, data representing a graph structure expressing the relationships among data elements is stored. A description is given below, assuming that the relationships among data elements are expressed by the RDF by way of example. However, the search method of this exemplary embodiment may be applicable to methods other than the RDF.

Figure 2:
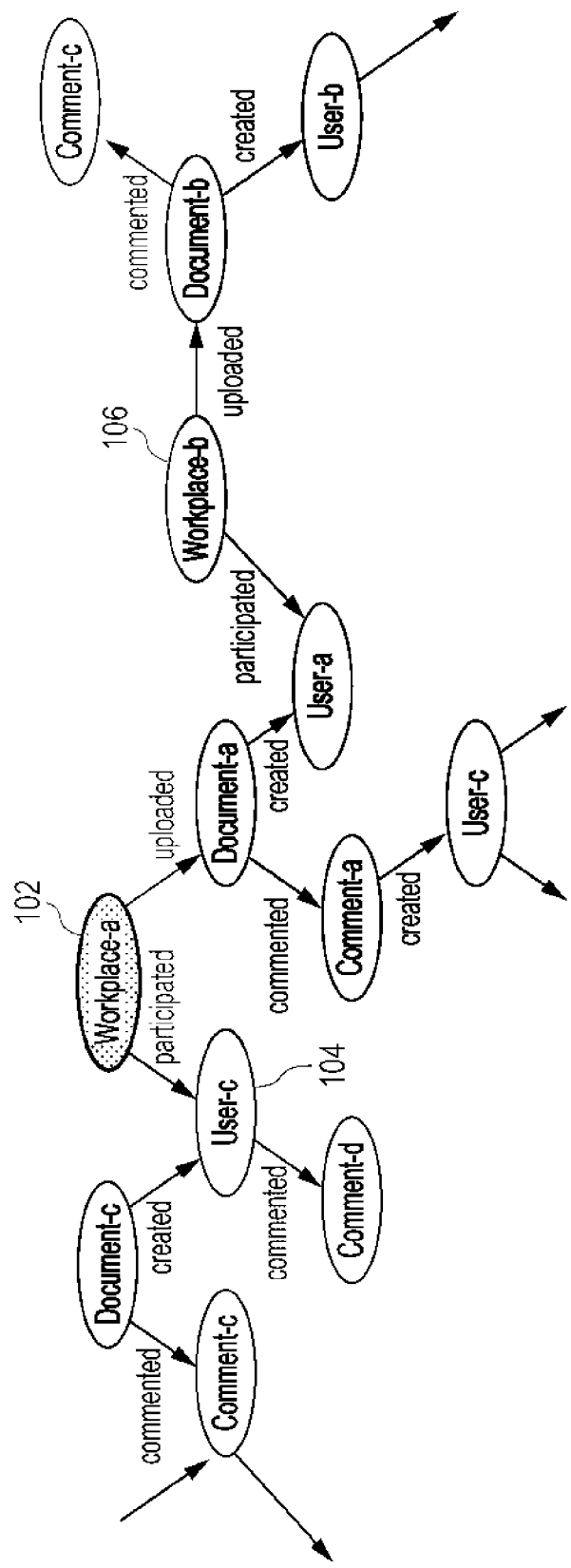
FIG. 2 illustrates an example of a graph configured by a set of data elements.

FIG. 2 illustrates an example of a graph expressing the relationships among data elements. In this example, elliptic nodes represent data elements, and links (indicated by the arrows) connecting the nodes represent the relationships among the nodes. In this example, the character strings shown within the nodes describe at least part of the data content of the corresponding data elements, and the character strings shown in the vicinities of the arrows of the links describe the types of relationships between the corresponding data elements. In the case of the RDF, the node near the tail of an arrow represents the subject, while the node near the head of an arrow represents the object. The link (arrow) indicates the predicate, which is the relationship between the two nodes. For example, the relationship between a node 102 and a node 104 indicates that a workplace having an identifier "Workplace-a" is a workplace in which a user having an identifier "User-c" participated. In other words, the "User-c" participated in the "Workplace-a".

FIG. 3 illustrates an example of data forming the graph shown in FIG. 2. The data shown in FIG. 3 includes plural "triples", which are sets of subjects, predicates, and objects. Data, such as the data shown in FIG. 3, is registered in the database 10. However, this is an example only, and data formats other than that shown FIG. 3 may be used as long as they can describe the relationships among data elements.

Referring back to the description of the search apparatus shown in FIG. 1, the database 10 may be implemented in a computer in which functions of searching graphs, such as a related-node extracting unit 22 or a search processor 26, which are described later, are implemented. Alternatively, the database 10 may be implemented in another computer connected to the above-described computer via a network, such as the Internet.

A reference-node input receiving unit 12 receives an input of a reference node from a user as one of the items specified by the user for conducting a search. The reference node is a node, which serves as a reference position (i.e., a mark) for search. A number-of-hops input receiving unit 14 receives from a user an input of the maximum number of hops (i.e., the number of links) defining a search range starting from the reference node.

A search-condition input receiving unit 16 receives from a user an input of a search condition that is to be satisfied by a subject to be searched for (search subject) from a graph. The search subject may be specified, for example, in the form of a partial graph. A partial graph, which is used as a search condition, is typically a continuous graph formed by connecting at least one node with at least one link. Only one link or only one node may be specified as a partial graph representing a search condition. One or more nodes and one or more links contained in a partial graph representing a search condition may be used as a variable. The search condition may be one that allows the entirety of a partial graph to be obtained as a search result or at least one variable specified in a partial graph that matches the search condition to be obtained as a search result. In this case, a partial graph that matches the search condition represented in the form of a partial graph is searched for from the graph expressing the data stored in the database 10. The search condition may be described by a query language, such as SPARQL.

The search apparatus of this exemplary embodiment supports two types of search methods, which are the "initial search" and the "similarity search". The initial search is a search conducted by specifying a reference node and a search condition, while the similarity search is a search conducted by using the search results of the initial search. In the similarity search, the reference node may be specified, but it is not necessary to specify a search condition. For both the initial search and the similarity search, an input of the number of hops that defines a search range is optional, but is not obligatory. If the number of hops is not specified, the search range is the entirety of a graph formed of all the data stored in the database 10. Accordingly, an initial search user interface (UI) 18, which is a UI used for conducting the initial search, includes the reference-node input receiving unit 12, the number-of-hops input receiving unit 14, and the search-condition input receiving unit 16. A similarity search UI 20, which is a UI used for conducting the similarity search, includes the reference-node input receiving unit 12 and the number-of-hops input receiving unit 14. The reference-node input receiving unit 12, the number-of-hops input receiving unit 14, and the search-condition input receiving unit 16 generate an image of an input screen for specifying a reference node, the number of hops, and a search condition, for example, in the form of a webpage or in another format, and then provide the generated image to a client (for example, a web browser or a dedicated search client), which is operated by the user. In this case, the client may be implemented in a computer in which the search apparatus shown in FIG. 1 is implemented, or may be implemented in another computer connected to the above-described computer via a network, such as the Internet.

The related-node extracting unit 22 extracts nodes (links) contained in the range of the specified number of hops from the reference node. The partial graph representing a set of the extracted nodes serves as the search range. The set of the extracted nodes is stored in a related-node memory 24 as a set of related nodes.

The search processor 26 searches for partial graphs that match the search condition from the partial graph formed of a set of related nodes stored in the related-node memory 24. A search result memory 28 stores search results obtained by the search processor 26.

A sorting unit 30 performs ranking (scoring) of the search results stored in the search result memory 28 and sorting (rearranging) of the search results on the basis of the ranks (scores). In this exemplary embodiment, the sorting unit 30 has the two types of ranking/sorting functions, i.e., number-of-hops reference sorting processing 32 and path-similarity reference sorting processing 34.

The number-of-hops reference sorting processing 32 serves as a function of ranking and sorting search results on the basis of the number of hops (i.e., the number of links) from the reference node to each of the partial graph representing the search result. A search result having a smaller number of hops from the reference node has a higher rank (score), and the search results are sorted in descending order from the search results having higher scores. The number-of-hops reference sorting processing 32 is used, for example, when sorting the search results of the initial search conducted by the use of the initial search UI 18.

The path-similarity reference sorting processing 34 serves as a function of ranking and sorting search results on the basis of the similarity between the reference path and the path on the graph from the reference node to each of the search results. The reference path may be a path on the graph from the reference node used in the initial search to a search result selected by the user from among the search results obtained by the initial search. The path-similarity reference sorting processing 34 is used, for example, when ranking and sorting the search results obtained by the similarity search conducted using the search results of the initial search.

The number-of-hops reference sorting processing 32 and the path-similarity reference sorting processing 34 are examples only, and ranking (scoring) and sorting based on another reference may be employed. A sorting result memory 36 stores sorting results obtained by the sorting unit 30.

A search result presenting UI 40 executes user interface processing for presenting search results obtained by the related-node extracting unit 22 and the search processor 26 and sorting results obtained by the sorting unit 30 to a user. The search result presenting UI 40 includes a sorting result presenting unit 42 and a selection receiving unit 44.

The sorting result presenting unit 42 generates an image showing sorting results, i.e., a sorting result display image, such as the results stored in the sort result memory 36, obtained by the sorting unit 30 in the form of, for example, a webpage. The sorting result presenting unit 42 then provides the sorting result display image to a client, for example, a web browser or a dedicated search client, operated by the user.

The selection receiving unit 44 receives a search result selected by the user in the sorting result display image from among the search results sorted in accordance with the ranks (scores). For example, if the user selects, by using the selection receiving unit 44, a search result that the user would like to check in more detail from among the displayed search results, detailed information concerning the selected search result may be displayed. The detailed information includes display information concerning the path on the graph from the reference node to the partial graph of the search result (for example, by highlighting such a path) and information concerning nodes and links contained in the partial graph of the search result (for example, the content of a resource indicated by a uniform resource locator (URL) contained in a node). The selection receiving unit 44 has a function of receiving from the user the selection of a search result used as a reference for a subsequent similarity search among the sorted search results. When the user selects a search result used as a reference for the subsequent similarity search, the selection receiving unit 44 obtains the path on the graph from the reference node to the selected search result as the reference path, and stores the obtained path in a reference path memory 38. The reference path stored in the reference path memory 38 is referred to by the path-similarity reference sorting processing 34 when sorting the search results in the subsequent similarity search.

Figure 4:
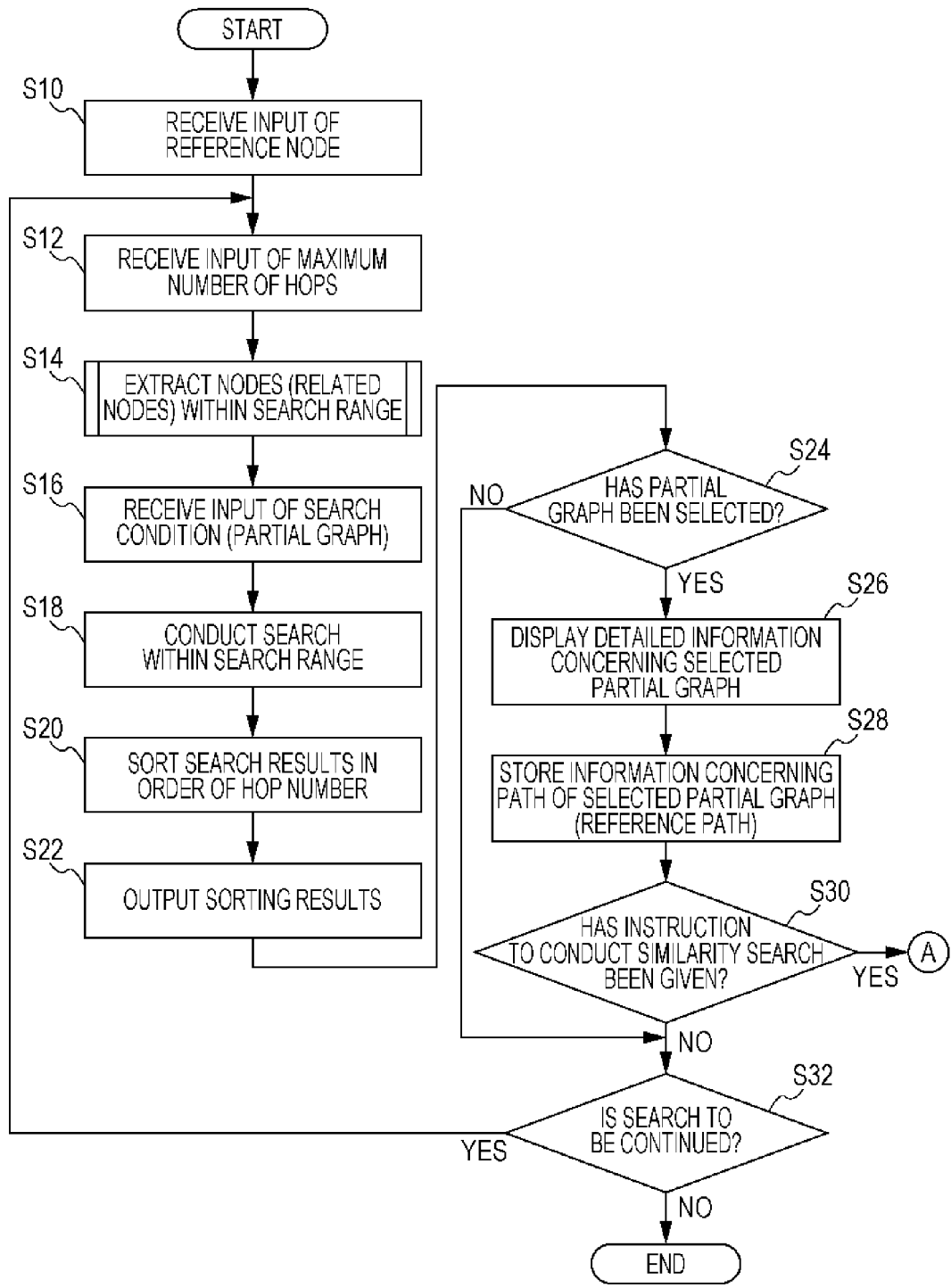
FIG. 4 is a flowchart illustrating an example of search processing.

A description is now given, with reference to the flowchart of FIG. 4, of an example of search processing performed by the search apparatus of this exemplary embodiment.

In this exemplary embodiment, a search is started by the initial search. In the initial search, as shown in FIG. 4, in step S10, the reference-node input receiving unit 12 of the initial search UI 18 receives from a user an input of a node used as a reference node selected from among the nodes on the graph. Then, in step S12, the number-of-hops input receiving unit 14 receives an input of the maximum number of hops from the user.

Then, in step S14, the related-node extracting unit 22 extracts, as a set of related nodes, a set of nodes contained in the range of the specified maximum number of hops from the reference node. A partial graph configured by the set of related nodes extracted from the original graph defined by the data stored in the database 10 is the search range in the following search processing. In the graph shown in FIG. 2, for example, if the node 102 is specified as the reference node and if the maximum number of hops is specified as three, the search range is the range defined by the rectangular region surrounded by the broken lines in FIG. 8.

Figure 5:
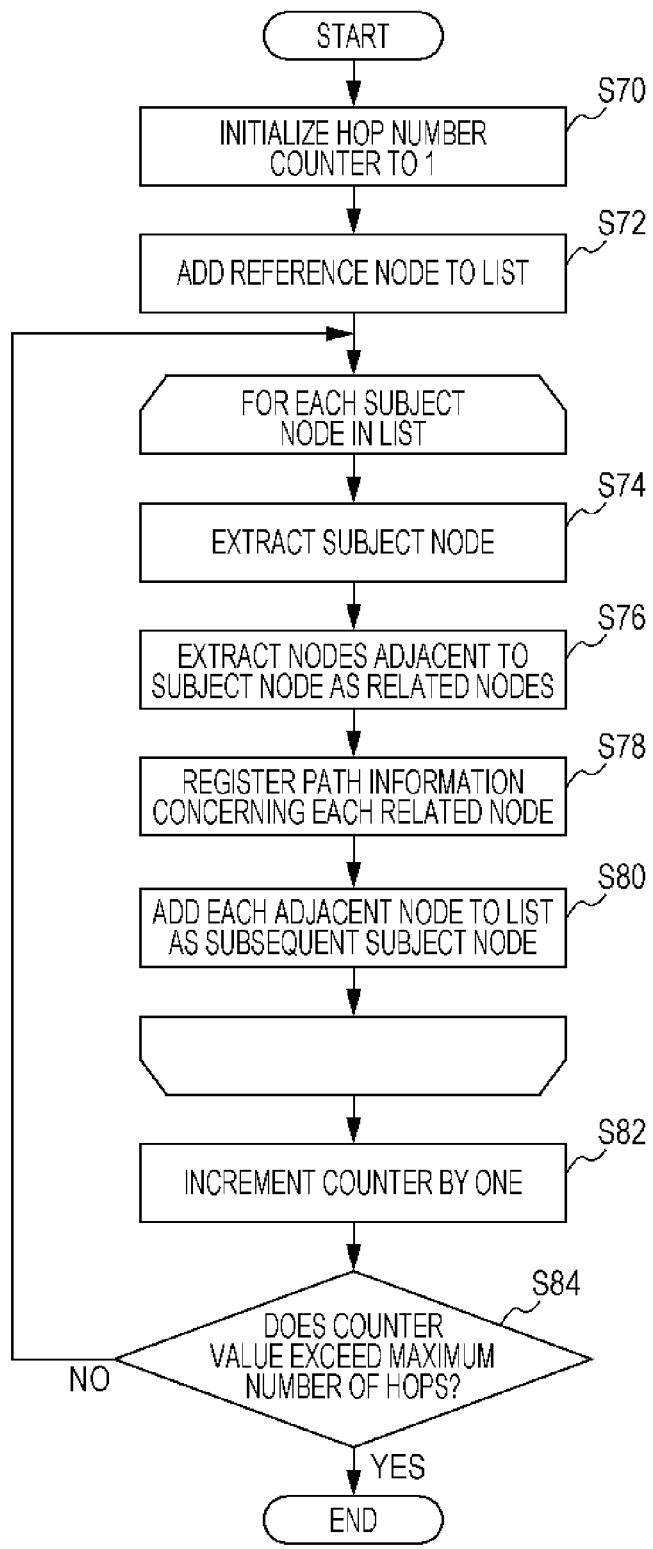
FIG. 5 is a flowchart illustrating an example of related-node extracting processing.

An example of the detailed procedure in step S14 is shown in FIG. 5. In step S70, the hop number counter is initialized to 1. Then, in step S72, the reference node received in step S10 is input into a list in which a subject node to be processed is registered. The subject node list is created for each hop number. For example, in step S72, in the subject node list corresponding to the hop number 1 indicated by the hop number counter, the reference node is registered as the sole node.

Then, steps S74 through S80 are repeated for each subject node in the list. More specifically, in step S74, one subject node is extracted from the list. In step S76, all the nodes positioned adjacent to the subject node (i.e., all the nodes connected to the subject node via one link) in the original graph are extracted as the related nodes. It is noted that, in step S76, the nodes that have already been extracted as the related nodes are not extracted again. Then, in step S78, the path on the graph from the reference node to each of the related nodes is determined, and information concerning the determined path is stored in the related node memory 24 in association with the related node.

Figures 6, 7:
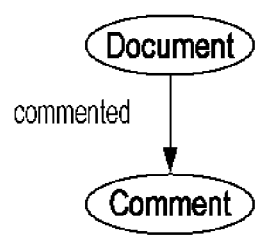
FIG. 6 illustrates an example of data obtained as a result of related-node extracting processing.
FIG. 7 illustrates an example of a partial graph specified as a search condition.

An example of data of the related nodes stored in the related node memory 24 is shown in FIG. 6. In this example, regarding each related node, identification information concerning the related node (shown as "node" in FIG. 6), the hop number from the reference node (shown as the "hop number" in FIG. 6), and path information concerning the path from the reference node to the related node (shown as the "path from reference node" in FIG. 6) are registered in the related node memory 24. As the "hop number", the value of the hop number counter indicated at a time when processing in step S78 is executed may be registered. The path information is, for example, a list of links and nodes on the graph positioned on the route starting from the reference node to the related node. The data of the related nodes shown in FIG. 6 by way of example have been extracted, assuming that the node 102 in the graph shown in FIG. 2 is used as the reference node.

Referring back to the description of FIG. 5, in step S80, each of the adjacent nodes extracted in step S76 is added as a subject node to the list corresponding to the subsequent hop number. The subject node extracted in step S74 has been deleted from the list.

After completion of processing in step S74 through S80 for all the subject nodes contained in the list corresponding to the current hop number, in step S82, the hop number counter is incremented by one. Then, it is determined in step S84 whether the value of the hop number counter exceeds the maximum number of hops. If the result of step S84 is NO, steps S74 through S80 are repeated for each of the subject nodes contained in the list corresponding to the hop number counter. If it is determined in step S84 that the value of the hop number counter exceeds the maximum number of hops, the process shown in FIG. 5 is completed.

Referring back to the description of FIG. 4, in step S16, the search-condition input receiving unit 16 of the initial search UI 18 receives an input of a search condition. An example of a partial graph specified as the search condition is shown in FIG. 7. The partial graph shown in FIG. 7 is a graph expressed by one triple including a subject, a predicate, and an object. In this triple, the node "Document" is the subject, the node "Comment" is the object, and the link "Commented" is the predicate. This partial graph shows that a certain comment is given to a certain document. A more complicated partial graph including three or more nodes may be specified as the search condition. In the process shown in FIG. 4, an input of a search condition is received after extracting the related nodes in step S14. However, an input of a search condition may be received before step S14. The search condition (partial graph) input by the user is described in, for example, SPARQL, and is delivered to the search processor 26.

Figure 8:
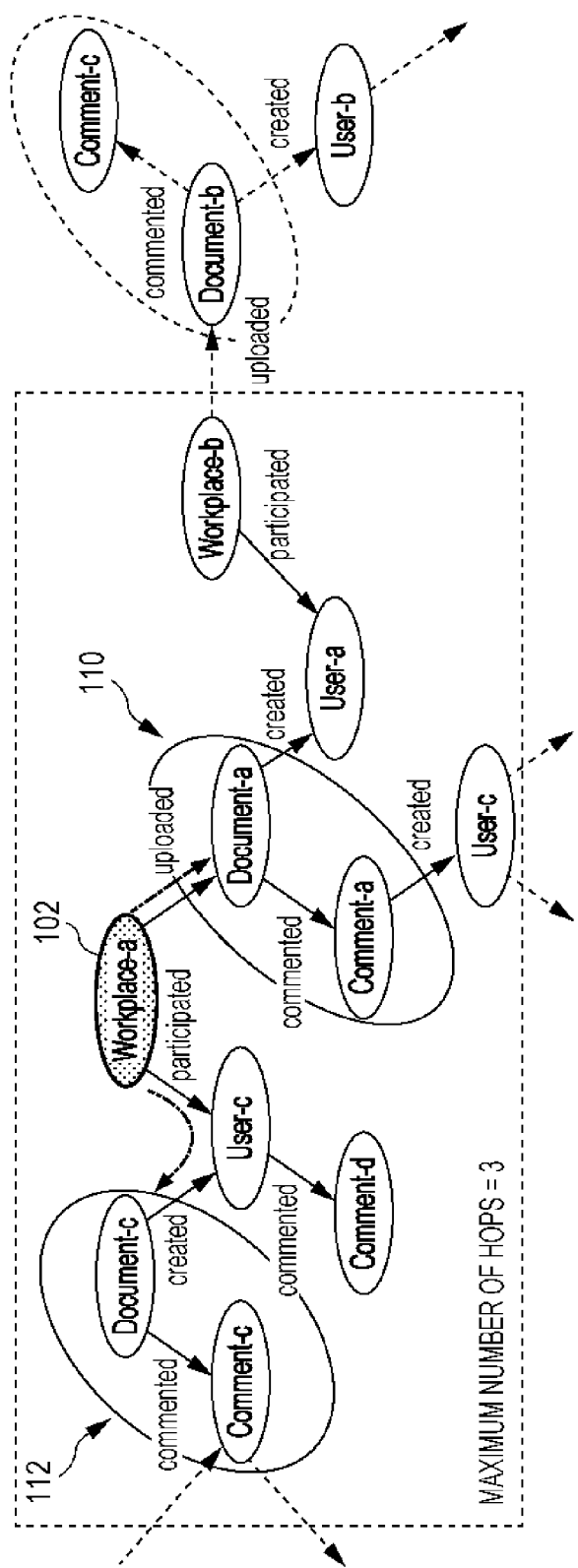
FIG. 8 illustrates an example of search results obtained as a result of conducting a search on the graph shown in FIG. 2.

In step S18, the search processor 26 searches the related nodes (i.e., the search range) extracted in step S14 for a partial graph that matches the search condition input in step S16. It is now assumed that, in the graph shown in FIG. 2 by way of example, a search is conducted under the following conditions: the node 102 is used as the reference node, the maximum number of hops is three; and the partial graph shown in FIG. 7 by way of example is used as the search condition. In this case, partial graphs 110 and 112 are obtained as the search results, as shown in FIG. 8.

Then, in step S20, the sorting unit 30 sorts the search results obtained by the search processor 26 in order of hop number. In this sorting processing, for each search result obtained in step S18, the hop number of each node contained in the partial graph of the search result counted from the reference node is obtained from the related node memory 24 (see FIG. 6), and the minimum hop number is set to be the hop number of the search result. Then, the search results are sorted in ascending order of hop number. The sorting results are stored in the sorting result memory 36. An example of the sorting results is shown in FIG. 9. In this example, the partial graphs corresponding to the search results are registered in the sorting result memory 36 in ascending order of hop number together with information concerning the path from the reference node to each of the partial graphs. This information is information concerning the path from the reference node to the node having the minimum hop number in the partial graph of each search result. The path information can be obtained from the related-node memory 24. It is noted that the graphs used in the RDF are directed graphs, i.e., the links expressed by the predicates are, for example, arrows pointing from the subjects to the objects. Accordingly, links contained in a path from the reference node to a partial graph include forward links and backward links, as viewed in the direction from the reference node to the entrance of the partial graph. In FIG. 9, the backward links are underlined.

In the example of the sorting processing, the minimum hop number out of the hop numbers assigned to the nodes contained in the partial graph of the search result is set to be the hop number of the search result. However, this is an example only, and the maximum hop number out of the hop numbers assigned to the nodes contained in the partial graph of the search result may be set to be the hop number of the search result.

After obtaining the sorting results as described above, in step S22, the sorting result presenting unit 42 provides the sorting results to the user in the form of, for example, a display image. In this display image, the search results sorted in accordance with rank are displayed together with information concerning the path from the reference node to each of the search results on the graph.

In many cases, it is difficult for a user to specify in advance, as a search condition, the entirety of a path from a reference node to a partial graph, which is a search result. It is however much easier to specify a reference node and a partial graph (search condition). If the user inputs the reference node and a partial graph, which is a search condition, from a user's vague memory, into the search apparatus of this exemplary embodiment, the search apparatus provides search results (partial graphs) that satisfy the search condition to the user together with information concerning the path from the reference node to each partial graph. The user specifies a desired search result from the partial graphs of the search results by referring to the path information. In this sense, the path information is principal information, and the ranking based on hop number is supplementary information.

Figure 10:
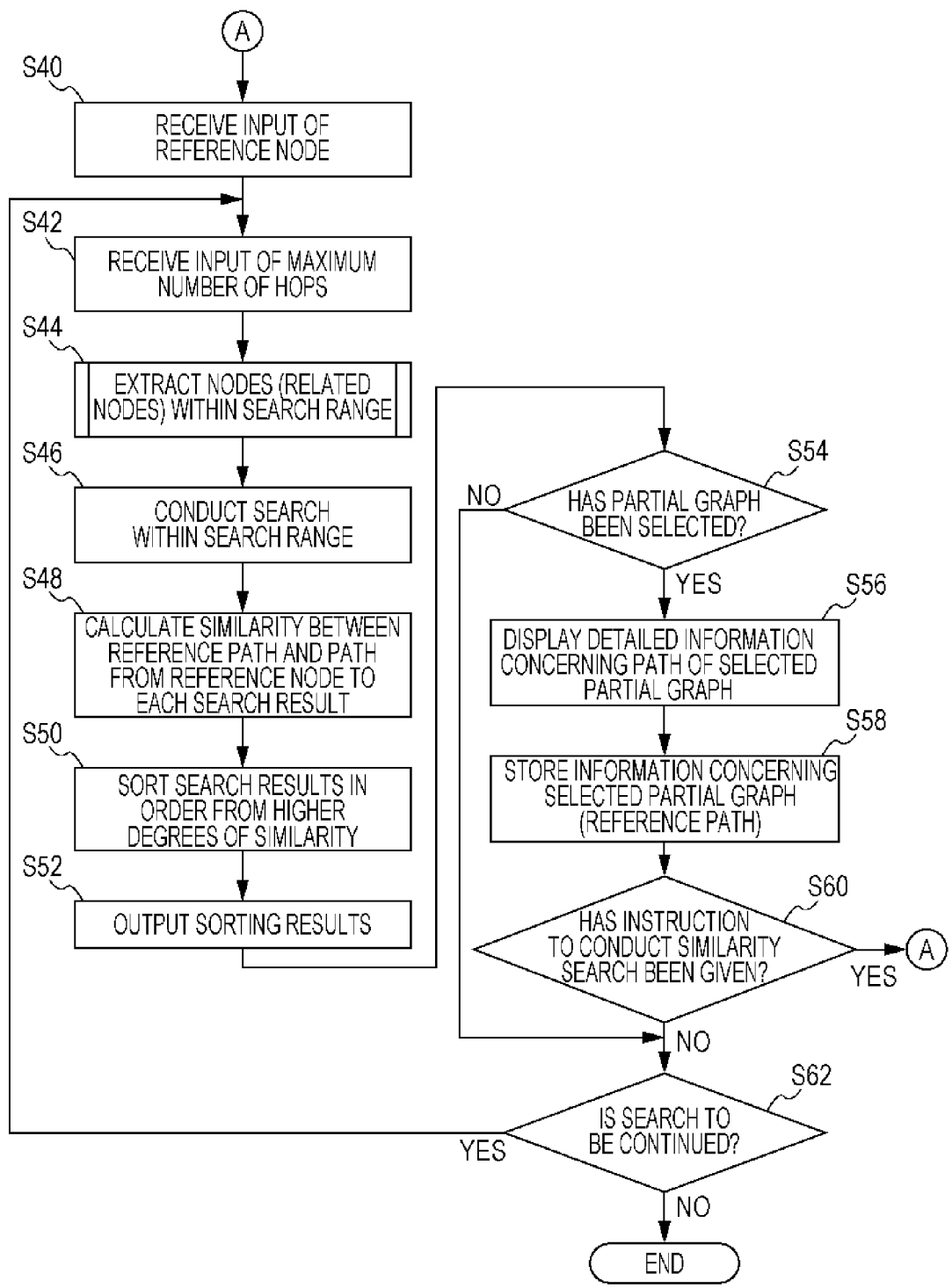
FIG. 10 is a flowchart illustrating an example of similarity search processing.

The user may select a partial graph that the user would probably like to obtain from the partial graphs contained in the sorting results. The selected partial graph is then received by the selection receiving unit 44. That is, it is determined in step S24 whether a partial graph has been selected. If the result of step S24 is YES, in step S26, the sorting result presenting unit 42 displays detailed information concerning the selected partial graph. Then, in step S28, information concerning the path from the reference node to the selected partial graph is registered in the reference path memory 38. If a partial graph is selected from the sorting results, a graphical user interface (GUI), for example, for giving an instruction to conduct a similarity search is displayed on the screen. Then, it is determined in step S30 whether the user has given an instruction to conduct a similarity search. If the result of step S30 is YES, the process shown in FIG. 10 is executed. Instead of giving an instruction to conduct a similarity search, the user may select another partial graph from the sorting results (this alternative is not shown in FIG. 4), in which case, steps S26 and S28 are executed on a newly selected partial graph.

Instead of shifting to a similarity search, at least one of the maximum number of hops and the search condition (partial graph) may be changed. It is determined in step S32 whether such a change has been made, i.e., whether the search is to be continued. If the result of step S32 is YES, the process returns to step S12, and a new maximum number of hops or a new search condition is set, and search processing in step S18 is re-executed accordingly.

It is then determined in step S32 whether the search is to be continued. If the user gives an instruction to complete the process, i.e., if the result of step S32 is NO, the series of search processing is completed.

An example of the process for conducting a similarity search is now described below with reference to the flowchart of FIG. 10. A similarity search is to search for a partial graph having a path from a new reference node similar to the reference path registered in step S28 of the initial search.

Details of the process shown in FIG. 10 are described below. In step S40, an input of a reference node used for a similarity search is received. Then, in step S42, an input of the maximum number of hops in the similarity search is received. If there is no change to the maximum number of hops, the number used in the initial search is used. In step S44, the related-node extracting unit 22 extracts a set of related nodes contained in the range of the maximum number of hops from the new reference node input in step S40, and stores the extracted set of related nodes in the related-node memory 24. Step S44 may be executed in a manner similar to step S14 in FIG. 5. In step S46, the search processor 26 conducts a search within the search range defined by the set of related nodes. The search condition used in step S46 is the same as that used in the initial search. After conducting a search, in step S48, the sorting unit 30 executes the path-similarity reference sorting processing 34 so as to calculate the similarity between the reference path stored in the reference path memory 38 and the path from the reference node to each search result. The calculation of the similarity may be performed according to a known method for calculating the similarity between graphs, such as the graph edit distance method. In step S50, in the path-similarity reference sorting processing 34, the search results are sorted in descending order in terms of the similarity (i.e., in order from higher degrees of similarity). In step S52, the sorting result presenting unit 42 provides the sorting results to the user in the form of, for example, a display image. In this case, information concerning the path from the reference node to each of the partial graphs obtained as the search results is also displayed together with the display image of the sorting results.

The user may select a specific sorting result (partial graph) from the sorting results obtained by conducting the similarity search. That is, it is determined in step S54 whether the user has selected a specific sorting result. If the result of step S54 is YES, in step S56, detailed information concerning the selected partial graph is displayed by the use of the search result presenting UI 40. In step S58, information concerning the path from the reference node to the selected partial graph is stored in the reference path memory 38. It is then determined in step S60 whether the user has given an instruction to conduct another similarity search. If the result of step S60 is YES, the process returns to step S40 in which a similarity search is further conducted by using the new path information stored in step S58 as the reference path. Instead of further conducting a similarity search, the user may select another partial graph from the sorting results (this alternative is not shown in FIG. 10), in which case, steps S56 and S58 are executed on a newly selected partial graph.

Instead of proceeding with conducting a similarity search on the basis of the new reference path stored in step S58, the maximum number of hops may be changed. It is determined in step S62 whether such a change has been made, i.e., whether search is to be continued. If the result of step S62 is YES, the process returns to step S42, and a new maximum number of hops is set, and search processing in step S46 and sorting processing in steps S48 and S50 are re-executed accordingly. In this case, the reference path used in step S48 is not the new reference path stored in step S58, but the reference path stored in the initial search.

It is now assumed that an initial search is conducted on the graph shown in FIG. 2 with the use of the partial graph shown in FIG. 7 as the search condition, and among the partial graphs 110 and 112 obtained as the search results shown in FIG. 8, the partial graph 112 is selected in step S24, and the operation is shifted to a similarity search. In this case, the reference path is "Workplace-a, participated, User-c, created"

Figure 11:
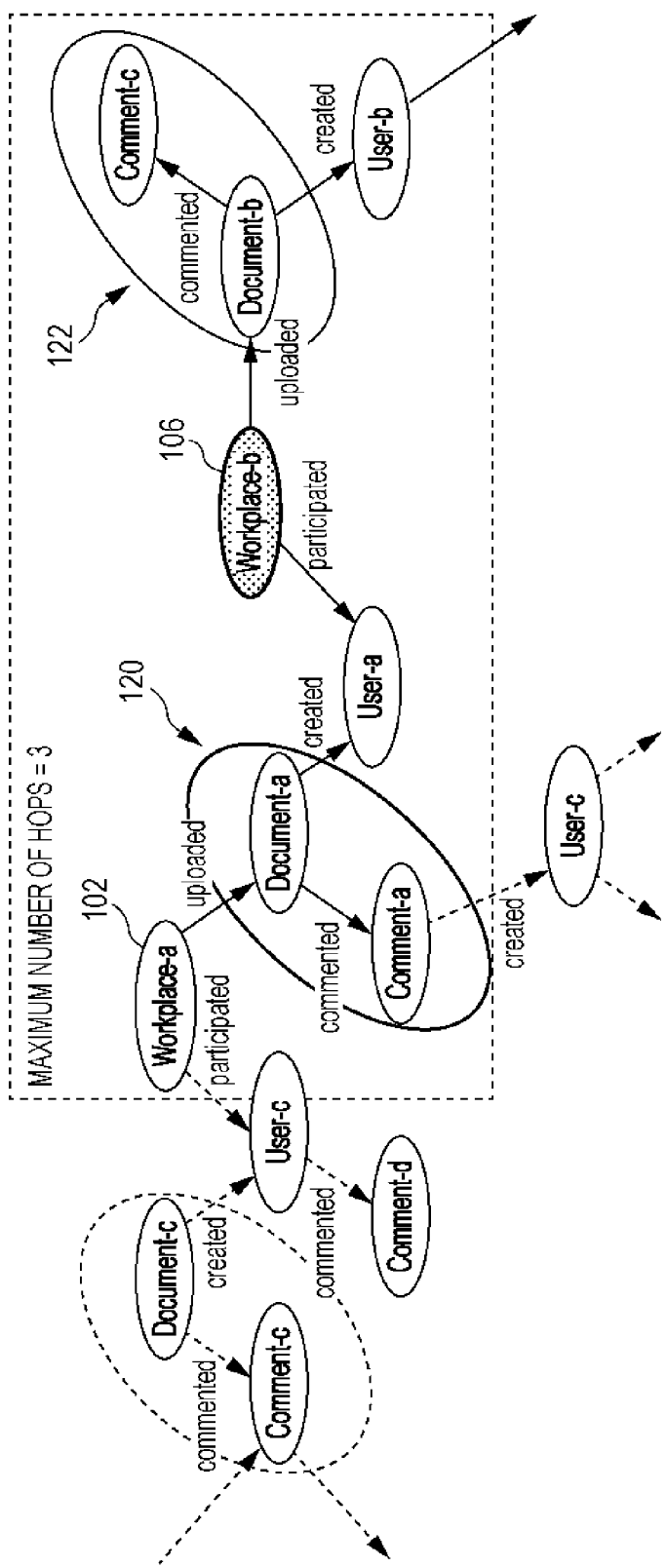
FIG. 11 illustrates an example of similarity search results.

(underlining indicates that the link is a backward link). Generalizing the nodes from the individual nodes to the type nodes, the reference path is designated by "Workplace, participated, User, created". In this state, if a node 106 is specified as the reference node for a similarity search and if the maximum number of hops is specified as three, partial graphs 120 and 122 shown in FIG. 11 are obtained by way of example in the search processing in step S46. The path from the reference node 106 to each of the partial graphs 120 and 122 is compared with the reference path "Workplace, participated in, User, created". Then, it is seen that the path from the reference node 106 to the partial graph 120 is closer to the reference path than the path from the reference node 106 to the partial graph 122. It is thus determined that the partial graph 120 has a higher degree of similarity than the partial graph 122. Therefore, the sorting result is in the order of partial graphs 120 and 122.

In the above-described example, in determining the similarity between the reference path and the path from the reference node to the partial graph of a search result, the partial graph itself is not included in the path from the reference node to the partial graph. However, the similarity may be determined by including the partial graph itself in the path.

As described above, in similarity search, a new reference node is specified, and a partial graph having a path similar to the reference path specified by the user in the initial search is searched, as viewed from the new reference node. In the similarity search, therefore, search results similar to the reference path, which is the previous search result, are obtained in terms of a new viewpoint (reference node).

In the above-described example, partial graphs that match a search condition within a search range defined by the maximum number of hops counted from a reference node are searched. In this case, unless the entirety of a partial graph is contained in the search range, that partial graph is not obtained as a search result. For example, in a graph 100 shown in FIG. 12, a search is conducted under the following conditions: the reference node is the node 102; the maximum number of hops is three; and a partial graph 130 is specified as a search condition. In this case, although a graph 135 matches the search condition, it is not obtained as a search result since part of the partial graph 135 extends to outside the search range (indicated by the rectangular region surrounded by the broken lines).

In contrast, if only part of a partial graph that matches a search condition is contained in the search range, that partial graph may be obtained as a search result. In this case, the maximum number of hops of a partial graph specified as a search condition (i.e., the maximum hop number out of the hop numbers assigned to the nodes in the partial graph) is added to the specified maximum number of hops, and the range within the extended number of hops from the reference node is set as the search range.

Figure 12:
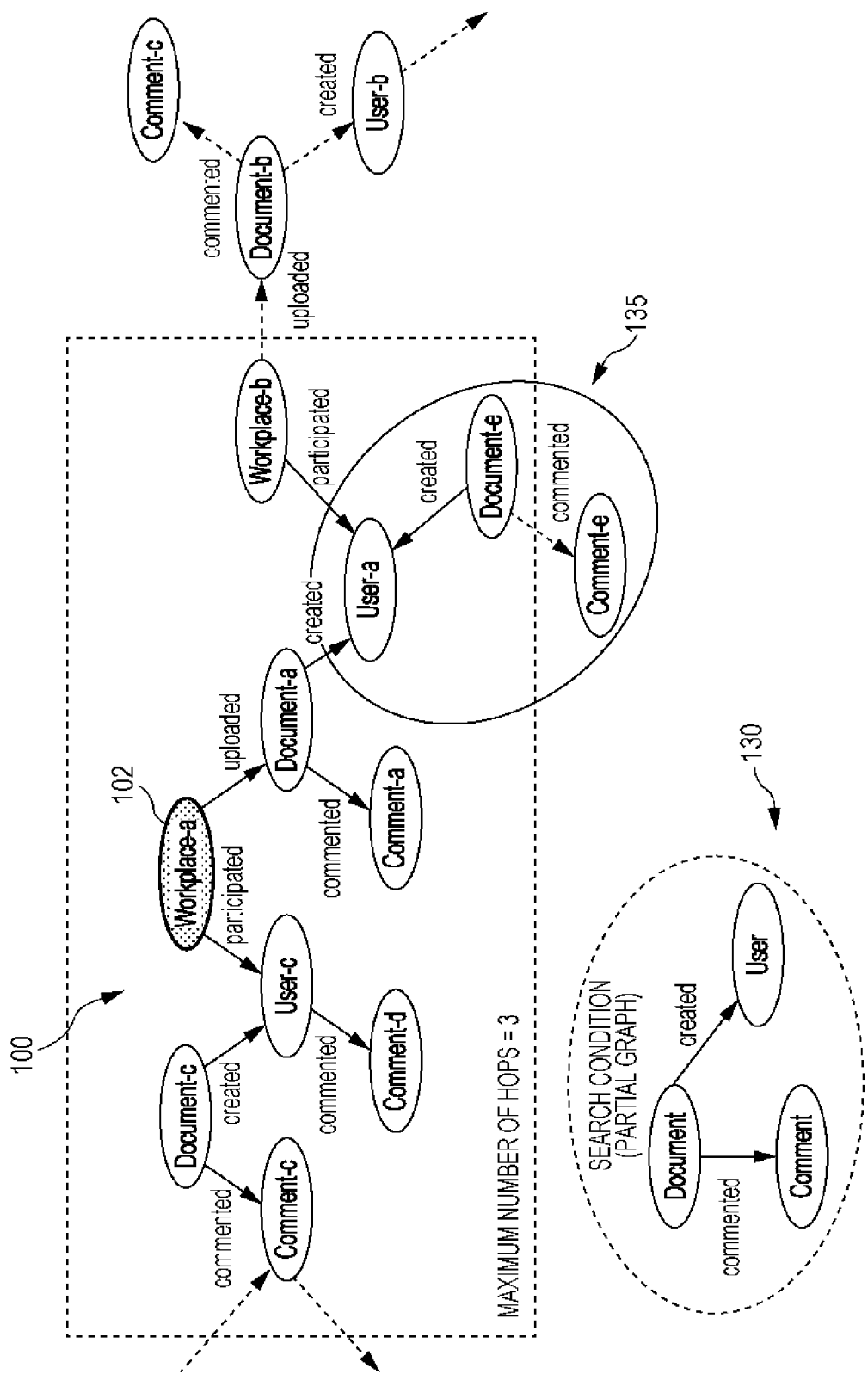
FIG. 12 illustrates an example of a case where part of a partial graph that satisfies a search condition extends to outside a search range.
Figure 13:
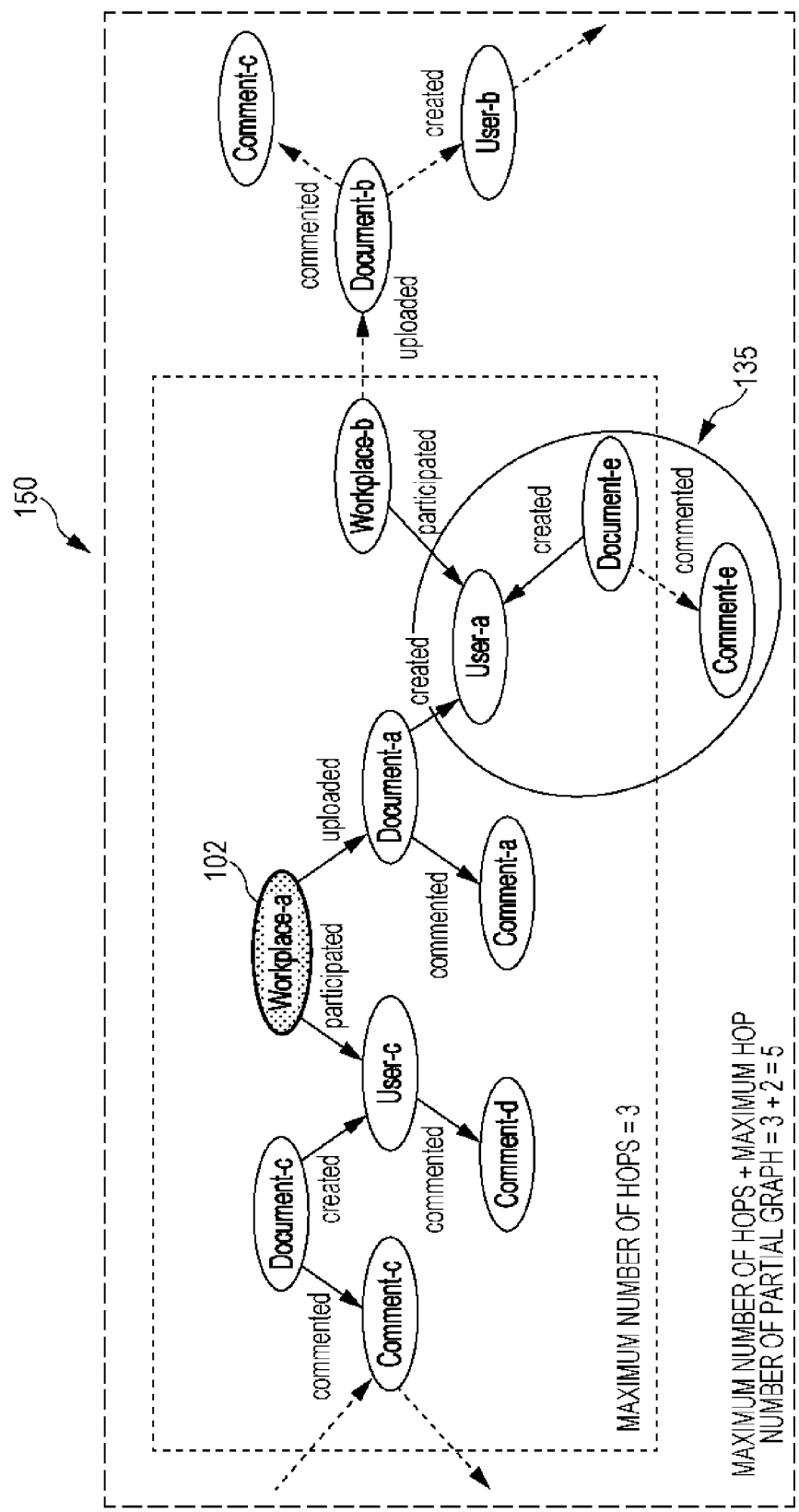
FIG. 13 illustrates an example of a case where a partial graph that satisfies a search condition extends to outside an original search range can be searched by the extension of the original search range.

For example, in the example shown in FIG. 12, since the maximum number of hops of the partial graph 130 specified as the search condition is two, two is added to the specified maximum number of hops, i.e., three, resulting in five. Accordingly, a range of five hops is the extended search range. As shown in FIG. 13, the partial graph 135 that satisfies the search condition, i.e., the partial graph 130, is entirely contained in an extended search range 150. Thus, the partial graph 135 is obtained as a search result. Such an extension of the search range may be applicable to either of the initial search or the similarity search.

The above-described search apparatus may be implemented by allowing a computer, such as a general-purpose computer, to execute a program describing the processing contents of the above-described individual functional modules. The computer may have the following circuit configuration. Hardware devices, such as a microprocessor, e.g., a central processing unit (CPU), memory devices (primary storage devices), e.g., a random access memory (RAM) and a read only memory (ROM), a hard disk drive (HDD) controller for controlling a HDD, various input/output (I/O) interfaces, and a network interface for controlling connection with a network, such as a local area network (LAN), are connected to each other via a bus. Additionally, a disk drive for reading and/or writing data from/into portable disk recording media, such as a compact disc (CD) and a digital versatile disk (DVD), and a memory reader/writer for reading and/or writing data from/into various standards of portable non-volatile recording media, such as flash memory devices, may be connected to the above-described bus. The program describing the processing contents of the above-described functional modules is stored in a fixed storage device, such as a hard disk drive, via a recording medium, such as a CD or a DVD, or a communication medium, such as a network, and is installed into the computer. The program stored in the fixed storage device is read out to a RAM and is executed by a microprocessor, such as a CPU. Thus, the above-described set of functional modules is implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search apparatus that searches graph data for a graph including a plurality of nodes and links connecting the nodes, the search apparatus comprising:
   at least one microprocessor configured to function as:
   an input receiving unit that receives an input of a reference node from among the nodes of the graph, and an input of a search condition;
   a searching unit that searches the graph data for a node, a link, or a combination of a node and a link which satisfies the search condition;
   a search result data generating unit that generates search result data that indicates at least one search result obtained by the searching unit together with path data showing a path on the graph from the reference node to each of the at least one search result,
   wherein the at least one search result comprises a plurality of search results, and the search apparatus further comprises:
   a selection receiving unit that receives a search result selected by a user from among the search results;
   a path data memory that stores the path data indicating the path of the search result selected by the user;
   a similarity-search instruction receiving unit that receives an input of a second reference node from among the nodes of the graph and an instruction to conduct a similarity search,
   wherein the search unit, when an instruction to conduct the similarity search is given, performs a similarity search by searching the graph data for a node, a link, or a combination of a node and a link based on the second reference node, and performs control to present at least a part of a search result from the similarity search between a path on the graph from the second reference node to the at least part of the search result.

2. The search apparatus according to claim 1, wherein the search condition is a partial graph including at least one link, and the search unit performs the similarity search according to a number of hops from the second reference node, the number of hops being determined by adding a maximum number of hops of the partial graph to a preset number of hops for the similarity search, and performs control to present at least a part of the search result from the similarity search in order from higher degrees of similarity between the path on the graph from the second reference node to the at least part of the search result and the path indicated by the path data stored in the path data memory.

3. The search apparatus according to claim 2, the search condition is a partial graph including at least one link, and a maximum number of hops are input by the user, and the searching unit determines a total number of hops by adding a maximum number of hops of a partial graph specified by the search condition to the maximum number of hops input by the user.

4. The search apparatus according to claim 1, wherein the search condition is a partial graph including at least one link, and a maximum number of hops are input by the user, and the searching unit determines a total number of hops determined by adding a maximum number of hops of a partial graph specified by the search condition to the maximum number of hops input by the user.

5. The search apparatus according to claim 1, wherein the search unit performs control to present at least a part of the search result from the similarity search in order from higher degrees of similarity between a path on the graph from the second reference node to the at least part of the search result and a path indicated by the path data stored in the path data memory.

6. The search apparatus according to claim 1, wherein the input receiving unit receives an input of a maximum number of hops, and the searching unit searches the graph data for a node, a link, or a compbination of a node and a link which are less than or equal to the maximum number of hops from the reference node and satisfies the search condition.

7. A search method for searching graph data for a graph including a plurality of nodes and links connecting the nodes, the search method comprising:
receiving, using at least one processor, an input of a reference node from among the nodes of the graph, and an input of a search condition;
searching, using at least one processor, the graph data for a node, a link, or a combination of a node and a link which satisfies the search condition; and
generating, using at least one processor, search result data that indicates at least one search result obtained by the searching unit together with path data showing a path on the graph from the reference node to each of the at least one search result,
wherein the at least one search result comprises a plurality of search results, and the search method further comprises:
receiving a search result selected by a user from among the search results;
storing the path data indicating the path of the search result selected by the user;
receiving an input of a second reference node from among the nodes of the graph and an instruction to conduct a similarity search,
wherein when an instruction to conduct the similarity search is given, a similarity search is performed by searching the graph data for a node, a link, or a combination of a node and a link based on the second reference node, and control is performed to present at least a part of a search result from the similarity search between a path on the graph from the second reference node to the at least part of the search result.

8. The search method according to claim 7, wherein control is performed to present at least a part of the search result from the similarity search in order from higher degrees of similarity between a path on the graph from the second reference node to the at least part of the search result and a path indicated by the path data stored in the path data memory.

9. The search method according to claim 7, wherein an input of a maximum number of hops is received, and the graph data is searched for a node, a link, or a compbination of a node and a link which are less than or equal to the maximum number of hops from the reference node and satisfies the search condition.

10. A non-transitory computer readable medium storing a program causing a computer to execute a process for searching graph data for a graph including a plurality of nodes and links connecting the nodes the process comprising:
receiving an input of a reference node from among the nodes of the graph and an input of a maximum number of hops, and an input of a search condition;
searching the graph data for a node, a link, or a combination of a node and a link which are less and or equal to the maximum number of hops from the reference node and satisfies the search condition; and
generating search result data that indicates at least one search result obtained by the searching unit together with path data showing a path on the graph from the reference node to each of the at least one search result,
wherein the at least one search result comprises a plurality of search results, and the process further comprises:
receiving a search result selected by a user from among the search results;
storing the path data indicating the path of the search result selected by the user;
receiving an input of a second reference node from among the nodes of the graph and an instruction to conduct a similarity search,
wherein when an instruction to conduct the similarity search is given, a similarity search is performed by searching the graph data for a node, a link, or a combination of a node and a link based on the second reference node, and control is performed to present at least a part of a search result from the similarity search between a path on the graph from the second reference node to the at least part of the search result.

11. The computer readable medium according to claim 10, wherein control is performed to present at least a part of the search result from the similarity search in order from higher degrees of similarity between a path on the graph from the second reference node to the at least part of the search result and a path indicated by the path data stored in the path data memory.

12. The computer readable medium according to claim 10, wherein an input of a maximum number of hops is received, and the graph data is searched for a node, a link, or a compbination of a node and a link which are less than or equal to the maximum number of hops from the reference node and satisfies the search condition.

* * * * *